(12) United States Patent
Jaeger

(10) Patent No.: US 6,668,759 B1
(45) Date of Patent: Dec. 30, 2003

(54) BIRD ACTIVITY DEVICE, KIT AND METHOD OF USING

(76) Inventor: Lonnie R. Jaeger, 205 Summer View Dr., Winter Haven, FL (US) 33880

( * ) Notice: Subject to any disclaimer, the term of this patent is extended or adjusted under 35 U.S.C. 154(b) by 0 days.

(21) Appl. No.: 10/285,598

(22) Filed: Oct. 30, 2002

(51) Int. Cl.⁷ .............................................. A01K 29/00
(52) U.S. Cl. ...................................................... 119/700
(58) Field of Search ................................ 119/702, 707, 119/708, 467, 468, 459

(56) References Cited

U.S. PATENT DOCUMENTS

| | | | | |
|---|---|---|---|---|
| 8,486 A | * | 11/1851 | Mook | 108/3 |
| 80,561 A | * | 8/1868 | Osborn | 119/459 |
| 277,724 A | * | 5/1883 | Hendryx | 119/468 |
| 296,912 A | * | 4/1884 | Bishop | 40/446 |
| 1,887,869 A | * | 11/1932 | Clampitt | 119/468 |
| 3,057,328 A | * | 10/1962 | Swartz | 119/700 |
| 3,682,477 A | * | 8/1972 | Harkins | 119/702 |
| 3,994,262 A | * | 11/1976 | Suchowski et al. | 119/700 |

* cited by examiner

Primary Examiner—Thomas Price

(57) ABSTRACT

A bird activity device, kit and associated method is disclosed for use in allowing birds to perch onto the device. The device comprises: an axle; a suspending device; an internal carousel; and an external carousel. The suspending device is attached to the axle and is for suspending the axle of the device in a substantially horizontal alignment. The internal carousel is pivotally attached to the axle. The external carousel is pivotally attached to the axle, wherein the external carousel envelopes the internal carousel. The kit comprises an axle; a suspending device; an internal carousel; and an external carousel and an attachable toy. The method comprises the steps of affixing, allowing, clamping, clipping, connecting, latching, obtaining, screwing, sliding, and slipping.

4 Claims, 2 Drawing Sheets

BIRD ACTIVITY DEVICE, KIT AND METHOD OF USING

FIELD OF THE INVENTION

The present invention relates to pet care, more particularly to a bird activity device, kit and associated method of using the device for allowing birds to perch onto the device.

DESCRIPTION OF THE PRIOR ART

Household pets provide not only a pleasurable experience to the owners but have also been found to stimulate the overall health of the owners themselves. Therefore, it is important to care for pets by providing them with a healthy environment comprising good nourishment and places to play. Birds are known to be prone to being bored and as a result tend to rip their feathers from their bodies. Therefore, it is also important to stimulate birds by providing areas for the birds to perch and to play.

A wide variety of pet care devices is currently available on the commercial market and an even larger number of these types of devices are known in the art of pet care devices, for example, the bird-cage disclosed by Bishop in U.S. Pat. No. 228,438; the rotary perch disclosed by Lydecker in U.S. Pat. No. 1,180,595; the bird feeder rotary apparatus disclosed by Horkey in U.S. Pat. No. 5,165,364; the portable bird playgym disclosed by Segal in U.S. Pat. No. 5,413,068; the rotating bird feeder/house disclosed by Marshall in U.S. Pat. No. 5,868,101; the actuated feeder for birds and small animals disclosed by Gates in U.S. Pat. No. D361,172.

While all of the above-described devices fulfill their respective, particular objectives and requirements, the aforementioned patents do not describe a bird activity device having an axle; a suspending means; an internal carousel; and an external carousel. The combination of elements that would specifically match the user's particular individual needs by making it possible to suspending the device in a substantially horizontal alignment so that birds may perch on the axle, internal and external carousels. The above-described patents make no provision for a bird activity device having an axle; a suspending means; an internal carousel; and an external carousel.

Therefore, a need exists for a new and improved bird activity device having an axle; a suspending means; an internal carousel; and an external carousel. In this respect, the bird activity device according to the present invention substantially departs from the conventional concepts and designs of the prior art, and in doing so provides an apparatus primarily developed for the purpose of making it possible to suspend the device in a substantially horizontal alignment so that birds may perch on the axle, internal and external carousels.

SUMMARY OF THE INVENTION

The present device, kit and associated method, according to the principles of the present invention, overcomes the shortcomings of the prior art by providing a bird activity device, kit and associated method for use in allowing birds to perch onto the device. The device comprises: an axle; a suspending means; an internal carousel; and an external carousel. The suspending means is attached to the axle and is for suspending the axle of the device in a substantially horizontal alignment. The internal carousel is pivotally attached to the axle. The external carousel is pivotally attached to the axle, wherein the external carousel envelopes the internal carousel. The kit comprises an axle; a suspending means; an internal carousel; and an external carousel and an attachable toy. The method comprises the steps of affixing, allowing, clamping, clipping, connecting, latching, obtaining, screwing, sliding, and slipping.

In view of the foregoing disadvantages inherent in the known type bird activity devices now present in the prior art, the present invention provides an improved bird activity device, which will be described subsequently in great detail, is to provide a new and improved bird activity device which is not anticipated, rendered obvious, suggested, or even implied by the prior art, either alone or in any combination thereof.

To attain this, the present invention essentially comprises an axle; a suspending means; an internal carousel; and an external carousel. The suspending means is attached to the axle and is for suspending the axle of the device in a substantially horizontal alignment. The internal carousel is pivotally attached to the axle. The external carousel is pivotally attached to the axle, wherein the external carousel envelopes the internal carousel.

There has thus been outlined, rather broadly, the more important features of the invention in order that the detailed description thereof that follows may be better understood, and in order that the present contribution of the art may be better appreciated.

The invention may also include a toy attached to the device. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bird activity device that has all the advantages of the prior art bird activity device and none of the disadvantages.

It is another object of the present invention to provide a new and improved bird activity device that may be easily and efficiently manufactured and marketed.

An even further object of the present invention is to provide a new and improved bird activity device that has a low cost of manufacture with regard to both materials and labor, and which accordingly is then susceptible of low prices of sale to the consuming public, thereby making such multipurpose storage unit and system economically available to the buying public.

Still another object of the present invention is to provide a new bird activity device that provides in the apparatuses and methods of the prior art some of the advantages thererof, while simultaneously overcoming some of the disadvantages normally associated therewith.

Even still another object of the present invention is to provide a bird activity device having an axle; a suspending means; an internal carousel; and an external carousel. The combination of elements makes it possible to suspending the device in a substantially horizontal alignment so that birds may perch on the axle, internal and external carousels.

Yet still another object of the present invention is to provide a kit comprising an axle; a suspending means; an internal carousel; and an external carousel and an attachable toy.

Lastly, it is an object of the present invention to provide a new and improved method comprises the steps of affixing, allowing, clamping, clipping, connecting, latching, obtaining, screwing, sliding, and slipping.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompany drawings and description matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
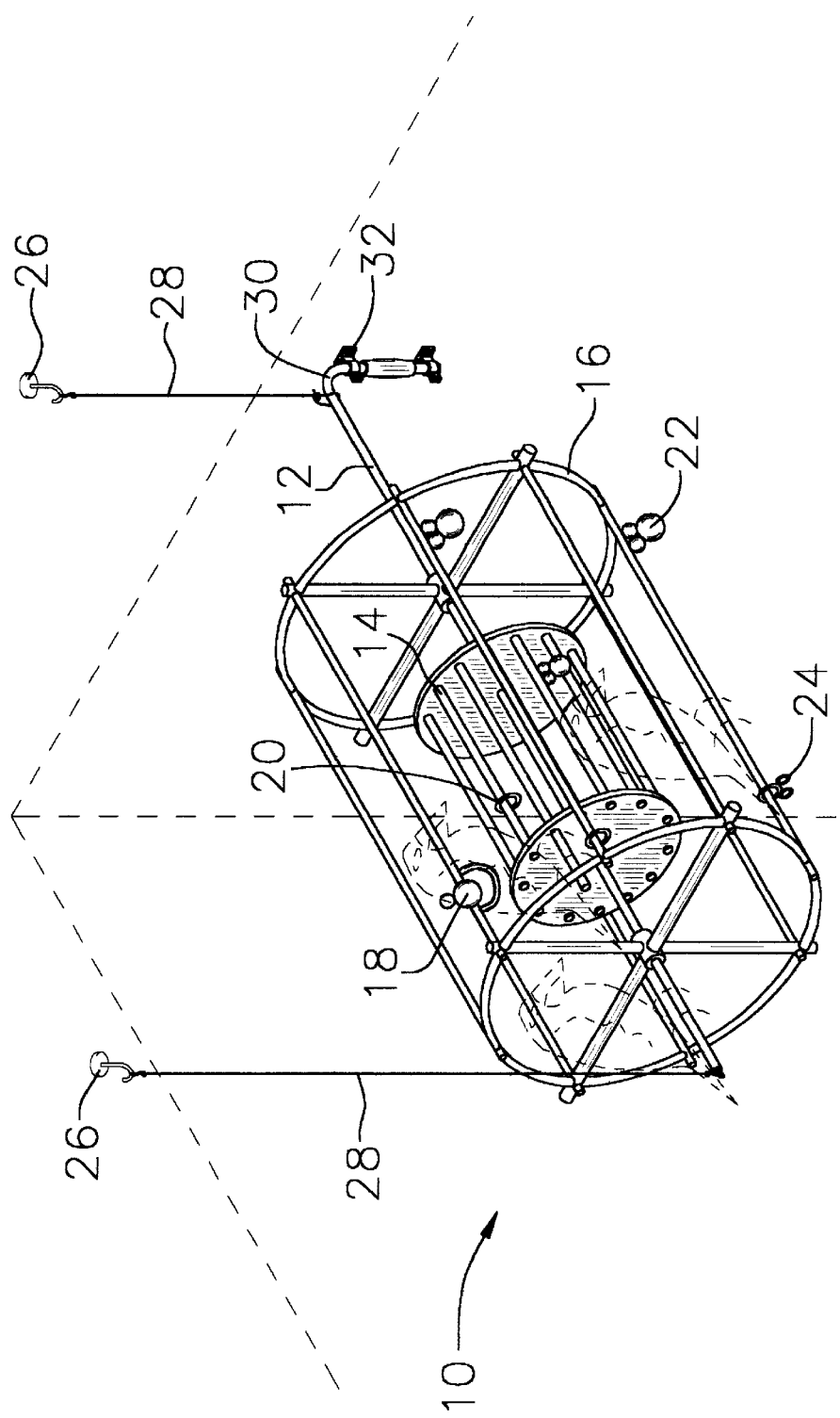
FIG. 1 is a perspective view of a preferred embodiment of the bird activity device constructed in accordance with the principles of the present invention.
Figure 2:
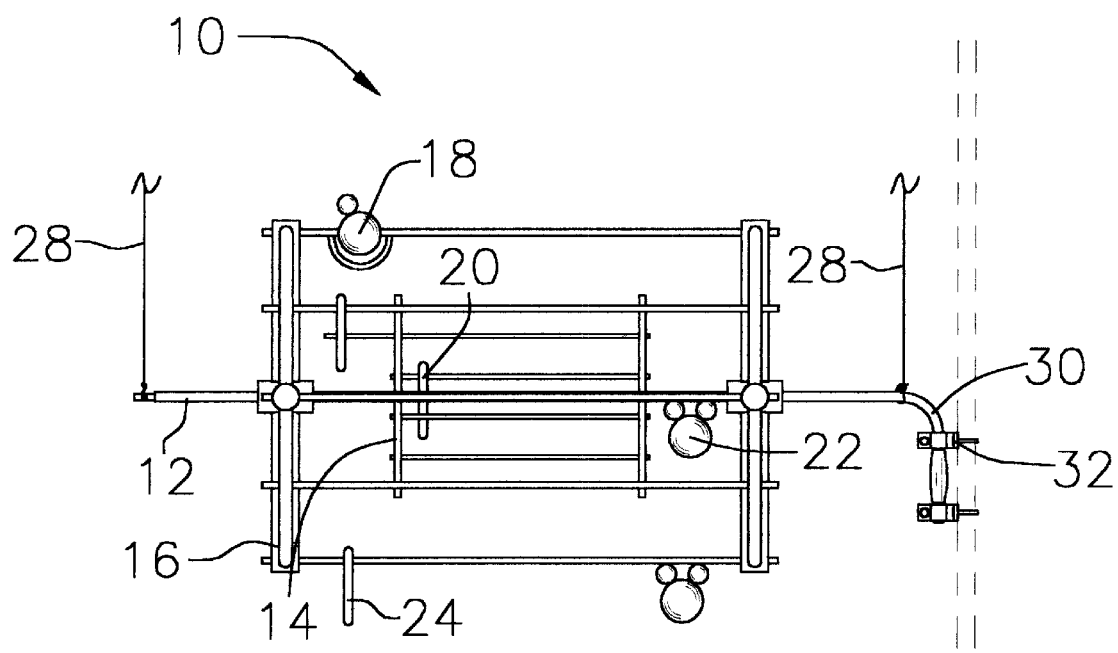
FIG. 2 is a frontal view of a preferred embodiment of the bird activity device of the present invention.
Figure 3:
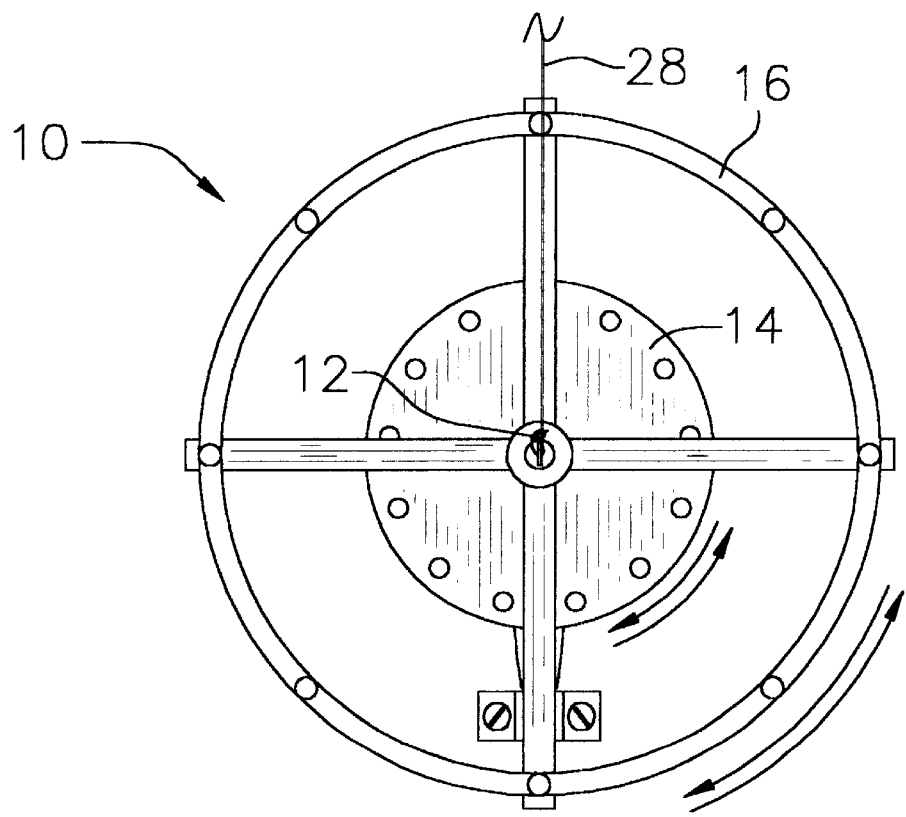
FIG. 3 is a side view of a preferred embodiment of the bird activity device of the present invention.

Referring now to the drawings, and in particular FIGS. 1 to 3 thereof, one preferred embodiment of the present invention is shown and generally designated by the reference numeral 10. One preferred embodiment of the bird activity device 10 comprises: an axle 12; a suspending means; an internal carousel 14; and an external carousel 16. The suspending means is attached to the axle 12 and is for suspending the axle 12 in a substantially horizontal alignment. The internal carousel 14 is pivotally attached to the axle 12. The external carousel 16 is pivotally attached to the axle 12, the external carousel 16 enveloping the internal carousel 14.

The suspending means of the device may be any commercially available apparatus as long as it is able to suspend the device from either a ceiling or a wall or both. One preferred configuration of the suspending means comprises a pair of ceiling hooks 26 and a pair of cords 28, wherein each cord 28 is attached to a corresponding ceiling hook 26 and connected to a corresponding opposite end of the axle 12. Each ceiling hook 26 of this preferred suspending means is selected from the group consisting a closed eyelet and an open eyelet. Each cord 28 of this preferred suspending means is selected from the group consisting of monofilament plastic, braided nylon string, cotton string, plastic string, braided string, braided cotton rope, braided plastic rope, metal ball chain, plastic ball chain, metal link chain, plastic coated string, fibre flat strap, flattened plastic ribbon, plastic link chain, flexible hose, and metal wire. Another preferred configuration of the suspending means comprises a substantially perpendicular elbow joint 30 at the distal end of the axle 12, whereby the axle 12 having an L-shaped configuration; and a bracket 32 pivotally attachable to the distal end of the axle 12, wherein the bracket 32 is attachable to a wall.

The design and shape of the internal carousel 14 of the device 10 may be any known geometric configuration. Some preferred configurations of the internal carousel 14 comprise an open framework selected from the group consisting circular cylinder, an elliptical cylinder, a triangular prism, a rectangular prism, a pentagonal prism, a hexagonal prism, a heptagonal prism, an octagonal prism, a circular sphere and an elliptical sphere.

The design and shape of the external carousel 16 of the device 10 may be any known geometric configuration. Some preferred configurations of the external carousel 16 comprise an open framework selected from the group consisting circular cylinder, an elliptical cylinder, a triangular prism, a rectangular prism, a pentagonal prism, a hexagonal prism, a heptagonal prism, an octagonal prism, a circular sphere, and an elliptical sphere.

An optional toy may be added to the device. The toy is attached to the device 10, wherein the toy attached to the device 10 is selected from a bell 18, a ring 20, a bead 22, and a clip 24.

One preferred embodiment of the A kit for assembling a bird activity device 10 comprises: an axle 12; a suspending means; an internal carousel 14; an external carousel 16 and toy. The suspending means is attachable to the axle 12 and is for suspending the axle 12 in a substantially horizontal alignment. The internal carousel 14 is pivotally attached to the axle 12. The external carousel 16 is pivotally attached to the axle 12, in which the external carousel 16 enveloping the internal carousel 14. The toy is attachable to either the external carousel 16 or to the internal carousel 14.

The toy of the kit may be is selected from a bell 18, a ring 20, a bead 22, and a clip 24.

The suspending means of the kit may comprise any apparatus that is capable of suspending the device. One preferred configuration of the suspending means comprises a pair of ceiling hooks 26; and a pair of cords 28, wherein each cord 28 is attachable to a corresponding ceiling hook 26 and connectable to a corresponding opposite end of the axle 12. Each hook 26 of the hooks 26 of the suspending means is selected of the group consisting a closed eyelet and an open eyelet. Each cord 28 of the cords 28 of the suspending means is selected from the group consisting of monofilament plastic, braided nylon string, cotton string, plastic string, braided string, braided cotton rope, braided plastic rope, metal ball chain, plastic ball chain, metal link chain, plastic coated string, fiber flat strap, flattened plastic ribbon, plastic link chain, flexible hose, and metal wire. Another preferred configuration of the suspending means comprises a substantially perpendicular elbow joint 30 at the distal end of the axle 12, whereby the axle 12 having an L-shaped configuration; and a bracket 32 pivotally attachable to the distal end of the axle 12, wherein the bracket 32 is attachable to a wall.

The design and shape of the internal carousel 14 of the kit may be any known geometric configuration. Some preferred configurations of the internal carousel 14 comprise an open framework selected from the group consisting circular cylinder, an elliptical cylinder, a triangular prism, a rectangular prism, a pentagonal prism, a hexagonal prism, a heptagonal prism, an octagonal prism, a circular sphere and an elliptical sphere.

The design and shape of the external carousel 16 of the kit may be any known geometric configuration. Some preferred configurations of the external carousel 16 comprise an open framework selected from the group consisting circular cylinder, an elliptical cylinder, a triangular prism, a rectangular prism, a pentagonal prism, a hexagonal prism, a heptagonal prism, an octagonal prism, a circular sphere, and an elliptical sphere.

One preferred embodiment of the method of using a kit for assembling a bird activity device 10, the method comprises the steps of affixing, allowing, clamping, clipping, connecting, latching, obtaining, screwing, sliding, and slipping. The obtaining step comprises obtaining the kit comprising: an axle 12; a means for suspending the axle 12 in a substantially horizontal alignment, the suspending means is attachable to the axle 12; wherein the suspending means comprises: a pair of ceiling hooks 26; a pair of cords 28, wherein each cord 28 is attachable to a corresponding ceiling hook 26 and connectable to a corresponding opposite end of the axle 12; a substantially perpendicular elbow joint 30 at the distal end of the axle 12, whereby the axle 12 having an L-shaped configuration; and a bracket 32 pivotally attachable to the distal end of the axle 12, wherein the bracket 32 is attachable to a wall; an internal carousel 14 pivotally attached to the axle 12 wherein the internal carousel 14 having a circular cylindrical open framework; an external carousel 16 pivotally attached to the axle 12, the external carousel 16 enveloping the internal carousel 14, wherein the external carousel 16 having a circular cylindrical open framework; and a plurality of attachable toys comprising a bell 18, a ring 20, a bead 22, and a clip 24. The affixing step comprises affixing the bracket 32 onto a wall. The sliding step comprises sliding the distal end of the axle 12 into the bracket 32. The screwing step comprises screwing in the pair of ceiling hooks 26 into a ceiling, wherein each ceiling hook 26 is positioned generally above the opposite ends of the axle 12. The connecting step comprises connecting one end of each cord 28 to each corresponding ceiling hook 26 screwed into the ceiling. The latching step comprises latching the bell 18 onto the external carousel 16. The clipping step comprises clipping the clip 24 onto the internal carousel 14. The clamping step comprises clamping the bead 22 onto the external carousel 16. The slipping step comprises slipping the ring 20 onto the internal carousel 14, wherein the steps of affixing, clamping, clipping, connecting, latching, obtaining, screwing, sliding, and slipping comprise assembling the device 10. The allowing step comprises allowing birds to perch onto the assembled device 10.

As to the manner of usage and operation of the present invention, the same should be apparent from the above description. Accordingly, no further discussion relating to the manner of usage and operation will be provided.

While a preferred embodiment of the bird activity device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

With respect to the above description then, it is to be realized that the optimum dimensional relationships for the parts of the invention, to include variations in size materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes or variations, thereof, or the them "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combination any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bird activity device comprising:
   an axle;
   a means for suspending said axle in a substantially horizontal alignment, wherein said suspending means is attached to said axle; and wherein said suspending means comprises:
   a substantially perpendicular elbow joint at the distal end of said axle, whereby said axle having an L-shaped configuration; and a bracket pivotally attachable to said distal end of said axle, wherein said bracket is attachable to a wall;

an internal carousel pivotally attached to said axle; and an external carousel pivotally attached to said axle, said external carousel enveloping said internal carousel.

2. A bird activity device comprising:

an axle, a means for suspending said axle in a substantially horizontal alignment, wherein said suspending means is attached to said axle;

an internal carousel pivotally attached to said axle, wherein said internal carousel has an open framework selected from the group consisting of a circular cylinder, an elliptical cylinder, a triangular prism, a rectangular prism, a pentagonal prism, a hexagonal prism, a heptagonal prism, an octagonal prism, a circular sphere and an elliptical sphere; and an external carousel pivotally attached to said axle, said external carousel enveloping said internal carousel.

3. A kit for assembling a bird activity device said kit comprising:

an axle;

a means for suspending said axle in a substantially horizontal alignment, wherein said suspending means is attached to said axle;

an internal carousel pivotally attached to said axle;

an external carousel pivotally attached to said axle, said external carousel enveloping said internal carousel; and an attachable toy;

wherein said suspending means comprises:

a substantially perpendicular elbow joint at the distal end of said axle, whereby said axle having an L-shaped configuration; and a bracket pivotally attachable to said distal end of said axle, wherein said bracket is attachable to a wall.

4. A kit for assembling a bird activity device, said kit comprising:

an axle;

a means for suspending said axle in a substantially horizontal alignment, wherein said suspending means is attachable to said axle;

an internal carousel pivotally attached to said axle, wherein said internal carousel has an open framework selected from the group consisting of a circular cylinder, an elliptical cylinder, a triangular prism, a rectangular prism, a pentagonal prism, a hexagonal prism, a heptagonal prism, an octagonal prism, a circular sphere and an elliptical sphere;

an external carousel pivotally attached to said axle, said external carousel enveloping said internal carousel; and an attachable toy.

* * * * *